United States Patent
Joo et al.

(10) Patent No.: US 11,154,927 B2
(45) Date of Patent: Oct. 26, 2021

(54) COMPOSITE CASTING SYSTEM AND COMPOSITE CASTING METHOD FOR MANUFACTURING HETEROGENEOUS MATERIAL CASTING PRODUCT, AND HETEROGENEOUS MATERIAL CASTING PRODUCT MANUFACTURED BY COMPOSITE CASTING METHOD

(71) Applicants: HYUNDAI MOTOR COMPANY, Seoul (KR); Kia Motors Corporation, Seoul (KR)

(72) Inventors: Hyo-Moon Joo, Seoul (KR); Ji-Yong Lee, Seoul (KR); Cheol-Ung Lee, Busan (KR); Mun-Gu Kang, Suwon-si (KR); Min-Soo Kim, Seoul (KR); Yoon-Ki Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/708,046

(22) Filed: Dec. 9, 2019

(65) Prior Publication Data
US 2020/0188993 A1 Jun. 18, 2020

(30) Foreign Application Priority Data
Dec. 13, 2018 (KR) .......................... 10-2018-0160831

(51) Int. Cl.
*B22D 27/11* (2006.01)
*B22D 18/02* (2006.01)
(Continued)

(52) U.S. Cl.
CPC .............. *B22D 27/11* (2013.01); *B22D 18/02* (2013.01); *B22C 9/06* (2013.01); *B22D 17/14* (2013.01); *B22D 17/24* (2013.01); *B22D 19/14* (2013.01); *B60G 2206/7102* (2013.01); *B60G 2206/8101* (2013.01)

(58) Field of Classification Search
CPC ........ B22D 27/11; B22D 18/02; B22D 17/24; B22D 19/02; B22D 19/04; B22D 19/16; B22D 31/00; B22D 19/14
See application file for complete search history.

(56) References Cited

U.S. PATENT DOCUMENTS

2011/0203763 A1* 8/2011 Kaemmerer ........... B22D 17/24
164/113

FOREIGN PATENT DOCUMENTS

KR 10-0680736 B1 2/2007

* cited by examiner

*Primary Examiner* — Kevin P Kerns
*Assistant Examiner* — Steven S Ha
(74) *Attorney, Agent, or Firm* — Mintz Levin Cohn Ferris Glovsky and Popeo, P.C.; Peter F. Corless

(57) ABSTRACT

A composite casting system for manufacturing a heterogeneous material casting product may include a fixed mold; a movable mold for opening or closing one side of the fixed mold; a slide core pin provided inside the fixed mold or the movable mold, and capable of being protruded to a cavity side, which is formed by a combination of the fixed mold and the movable mold, from the inside of the fixed mold or the movable mold; a high-pressure casting device for injecting high-pressure casting molten metal into the cavity; and a gravity casting device for injecting gravity casting molten metal through a gravity casting hole formed on the fixed mold or the movable mold.

8 Claims, 8 Drawing Sheets

(51) Int. Cl.
*B22D 17/24* (2006.01)
*B22C 9/06* (2006.01)
*B22D 19/14* (2006.01)
*B22D 17/14* (2006.01)

(A) FOUR RE-CRYSTALLIZATION NUCLEUSES
ARE FORMED IN THE PROCESSED TISSUE STATE (B) NEW RE-CRYSTALLIZATION NUCLEUS IS FORMED
WHILE THE ALREADY FORMED NUCLEUSES GROW (C) RE-CRYSTALLIZATION NUCLEUSES
GROW CONTINUOUSLY (D) PRIMARY RE-CRYSTALLIZATION IS
COMPLETED

COMPOSITE CASTING SYSTEM AND COMPOSITE CASTING METHOD FOR MANUFACTURING HETEROGENEOUS MATERIAL CASTING PRODUCT, AND HETEROGENEOUS MATERIAL CASTING PRODUCT MANUFACTURED BY COMPOSITE CASTING METHOD

CROSS-REFERENCE TO RELATED APPLICATION

This application claims priority to Korean Patent Application No. 10-2018-0160831, filed on Dec. 13, 2018, which is incorporated herein by reference in its entirety.

BACKGROUND OF THE DISCLOSURE

Field of the Disclosure

The present disclosure relates to a system and a method for manufacturing a casting product having heterogeneous material, and a heterogeneous material casting product manufactured by the method thereof.

Description of Related Art

Die casting is a casting manufacturing method of mass-producing in a short time by melting metal that becomes a material in a mold of a metal material called a die to press-fit it with high temperature and high pressure, and has mass production and high quality with the advantages, such as a high automation rate/a reduction in the manufacturing cost in mass production/dimensional stability/the beauty of the casting surface/lightweight and thinning of the parts/a fast manufacturing speed, such that it is widely used in manufacturing various parts for a vehicle. The die casting method is used in manufacturing various parts of a vehicle, for example, a cylinder block, a retainer, covers, a housing, brackets, etc. It is possible to secure cost competitiveness through the die casting method, thereby achieving a reduction in a cycle time through a high pressurizing force, thinning and lightweight, and good appearance quality The contents described in Description of Related Art are to help the understanding of the background of the present disclosure, and can include what is not previously known to those skilled in the art to which the present disclosure pertains.

SUMMARY OF THE DISCLOSURE

Aspects of the present disclosure provide a composite casting system and a composite casting method for manufacturing a heterogeneous material casting product, and a heterogeneous material casting product manufactured by the composite casting method, which can be advantageous to the bonding between heterogeneous materials, simplify the process, and save the cost compared to other methods in manufacturing the heterogeneous material casting product.

One aspect provides a composite casting system for manufacturing a heterogeneous material casting product according to one aspect of the present disclosure includes a fixed mold, a movable mold for opening or closing one side of the fixed mold, a slide core pin provided inside the fixed mold or the movable mold, and capable of being protruded to a cavity side, which is formed by a combination of the fixed mold and the movable mold, from the inside of the fixed mold or the movable mold, a high-pressure casting device for injecting high-pressure casting molten metal into the cavity, and a gravity casting device for injecting gravity casting molten metal through a gravity casting hole formed on the fixed mold or the movable mold.

In foregoing system, the slide core pin is coupled to be insertable into a mold rather than the side provided with the high-pressure casting device of the fixed mold and the movable mold.

In foregoing system, the gravity casting hole is formed to pass through the cavity from the upper portion of the fixed mold or the movable mold corresponding to the upward of the slide core pin protruded to the cavity.

In foregoing system, the diameter of the injection port of the cavity side of the gravity casting hole is equal to or smaller than the length protruded to the cavity side of the slide core pin.

In foregoing system, the gravity casting hole has a minimum of the inner diameter of the lowest surface on the flat cross section corresponding to the boundary with the cavity.

In foregoing system, the materials of the high-pressure casting molten metal and the gravity casting molten metal are different from each other.

In foregoing system, the high-pressure casting molten metal can be an aluminum material.

Another aspect provide a composite casting method for manufacturing a heterogeneous material casting product according to one aspect of the present disclosure includes protruding a slide core pin, which is inserted into a mold in which a cavity corresponding to the shape of a casting product to be cast is formed, to the cavity, injecting high-pressure casting molten metal into the cavity by a high-pressure casting device, inserting the slide core pin into the mold, and injecting gravity casting molten metal through a gravity casting hole formed to pass through the cavity from the upper portion of the mold.

In the foregoing method, the composite casting method for manufacturing the heterogeneous material casting product can further include cutting the interface between the gravity casting hole and the cavity.

In the foregoing method, the materials of the high-pressure casting molten metal and the gravity casting molten metal are different from each other.

In the foregoing method, the high-pressure casting molten metal is an aluminum material.

A further aspect of the present disclosure provides a heterogeneous material casting product manufactured by the above-described composite casting method.

According to the composite casting system and the composite casting method for manufacturing the heterogeneous material casting product of the present disclosure, it is possible to simplify the process to enable casting by a system that integrates the high-pressure casting and the gravity casting, thereby saving the cost due to the equipment, the transfer time, etc. compared to other heterogeneous material casting methods.

According to the aspects of the present disclosure, it is possible to apply the gravity casting only to the surface portion of the casting product, thereby easily manufacturing only the minimum necessary portion by the gravity casting.

In addition, since the high-pressure cast portion has a high temperature, it is further excellent in performance of the physical and partial melting and solidification bonding upon gravity casting.

Further, since it is possible to control the re-crystallization layer as the gravity casting is performed before the high-pressure cast portion is completely cooled after the high-pressure casting, it is advantageous to partial melting and solidification bonding at the interface between the high-pressure casting portion and the gravity casting portion.

DESCRIPTION OF EMBODIMENTS

In order to fully understand the present disclosure, operational advantages of the present disclosure, and aspects or features achieved by the embodiment of the present disclosure, reference should be made to the accompanying drawings illustrating embodiments of the present disclosure and the contents illustrated in the accompanying drawings.

In describing embodiments of the present disclosure, a description of known technology or repeated descriptions that can unnecessarily obscure the subject matter of the present disclosure will be reduced or omitted.

A die casting method is used in manufacturing a cylinder block, a retainer, covers, a housing, brackets, etc., and it is possible to secure cost competitiveness through the die casting method, thereby achieving a reduction in a cycle time through a high pressurizing force of 500 kg/cm$^2$, thinning and lightweight, and appearance quality.

However, it also has the limitations of reducing weldability, heat treatment (generation of blister), and applicability to various alloys.

Although the parts for the vehicle are also manufactured by the die casting with an aluminum material for lightweight, a reduction in the cost, etc., there exist many parts that cannot be manufactured using the die casting method.

For example, there are many vehicle parts that would be made of an aluminum material for lightweight, etc. However, when the parts have a surface portion contacting with or sliding over other parts, it may be required to have mechanical physical properties such as strength and abrasion resistance. Thus, the parts would not be made of an aluminum material.

To address the foregoing, the methods for manufacturing a heterogeneous material product may be introduced and used, considering lightweight, a reduction in the cost, and durability.

For example, there can be an insert casting, and the insert casting is a method of transferring the parts completed through gravity casting to insert it into a mold, and then casting the product by high-pressure casting.

Since such a method separately performs the gravity casting and the high-pressure casting, there may be factors disadvantageous to the cost such as a mold cost, an equipment cost, transportation, etc., and a cycle time may also be disadvantageous.

In addition, in the insert casting, for example, in case of the parts whose strength is to be considered only on a surface portion thereof, it is not easy to implement a mold, etc. for performing the gravity casting only for the surface portion.

Then, the portion having completed the gravity casting becomes a state with the stable physical properties at room temperature to increase the temperature again due to the influence of the molten metal upon the high-pressure casting (e.g., the temperature of the molten metal is about 740° C.), and a re-crystallization layer can be formed.

Figure 1A:
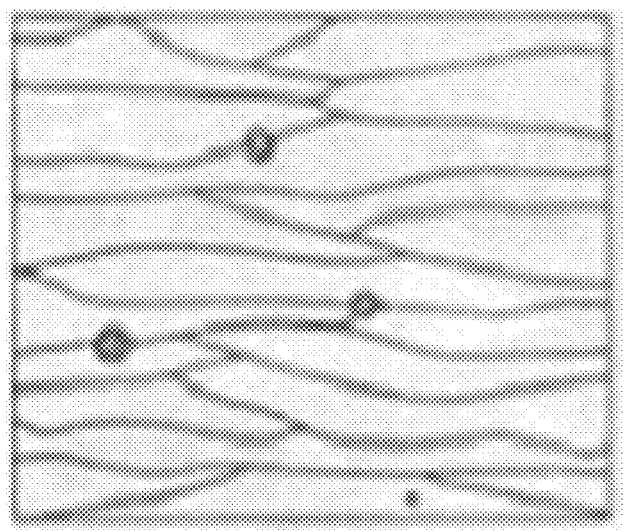
FIG. 1A to FIG. 1D are diagrams illustrating a process of forming a re-crystallization layer that can be formed by an example of casting.
Figure 1B:
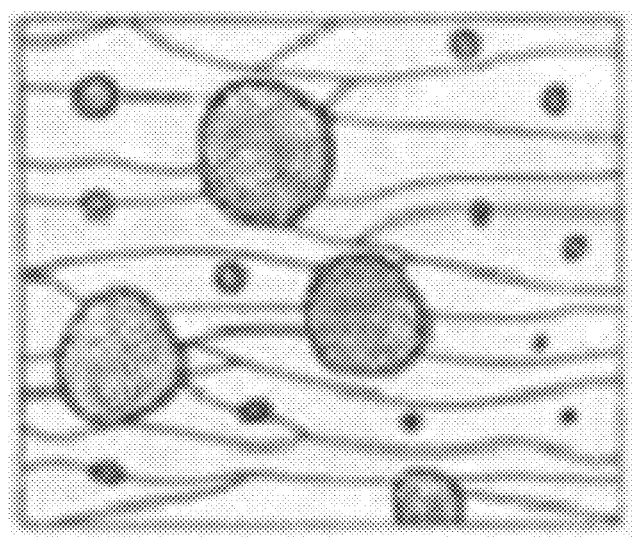
Figure 1C:
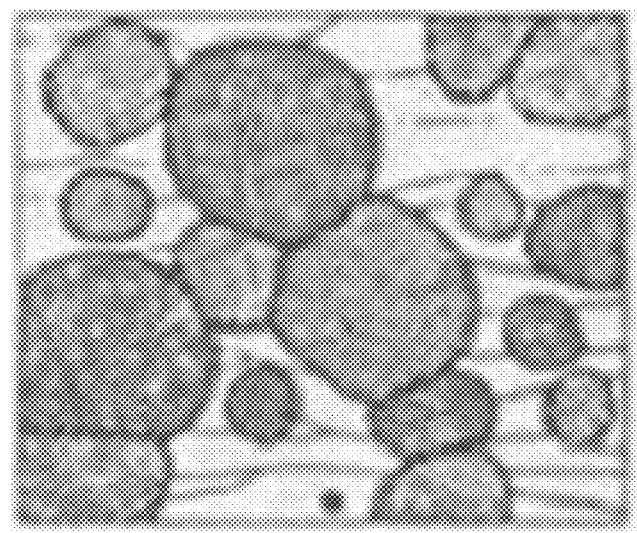
Figure 1D:
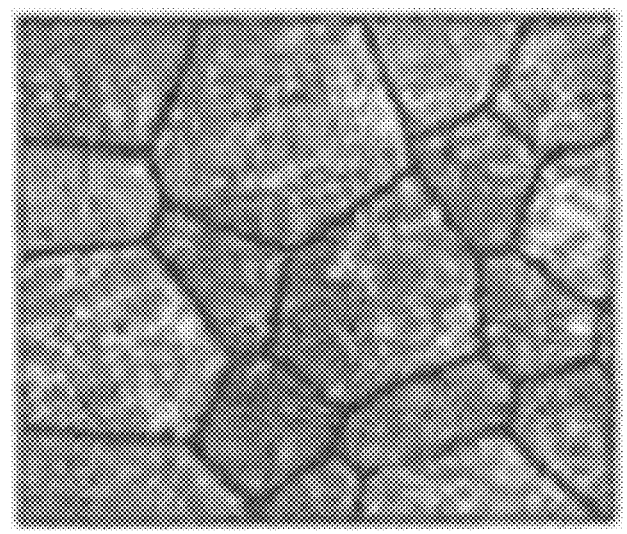
Figure 2:
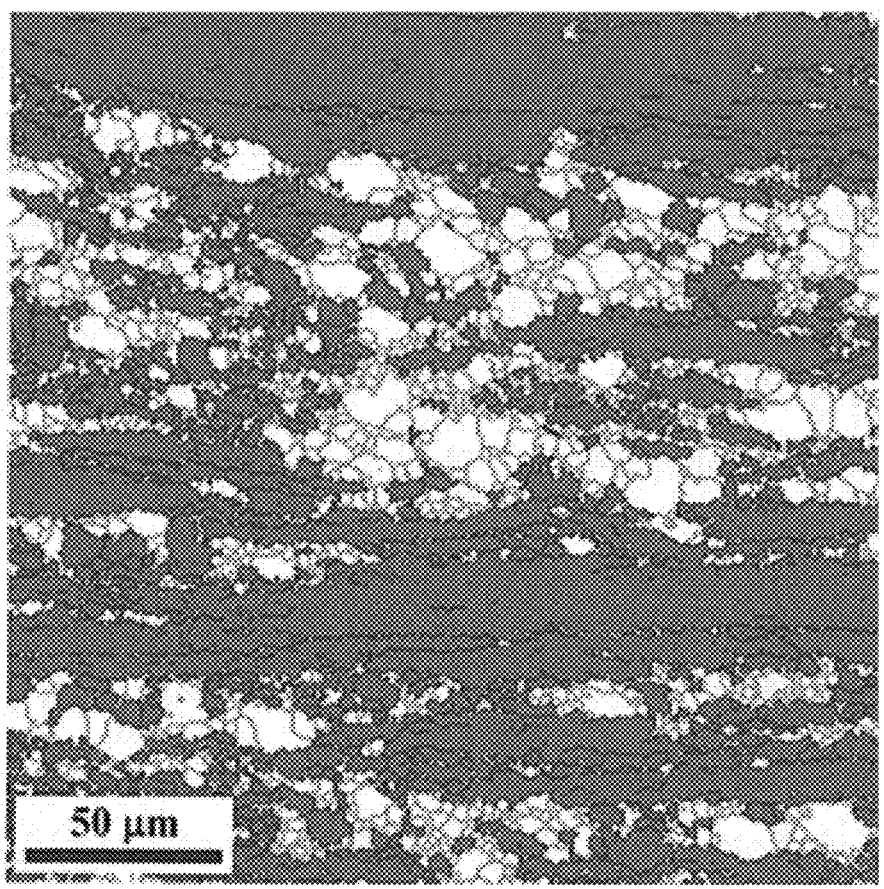
FIG. 2 is an enlarged diagram illustrating the re-crystallization layer.

A process of forming the re-crystallization layer is illustrated in order in FIG. 1A to FIG. 1D. And FIG. 2 is an enlarged diagram of the re-crystallization layer.

Such a re-crystallization layer can induce softening of the material to reduce the strength, and has the disadvantages even in the bonding of the interface between the gravity casting portion and the high-pressure casting portion.

Figure 3:
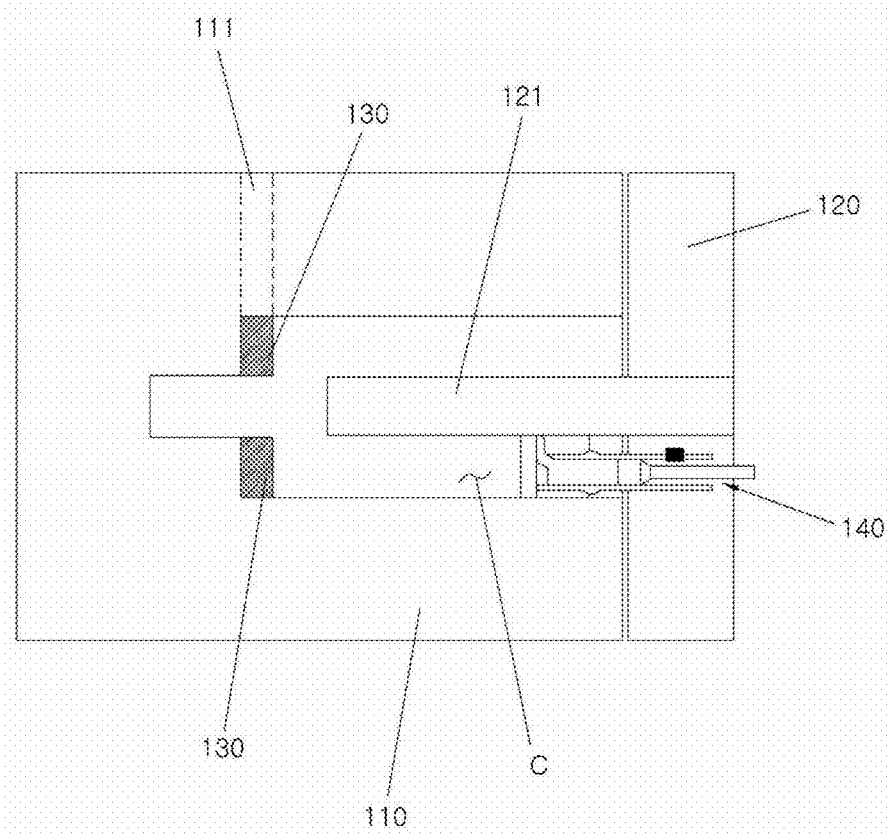
FIG. 3 is a diagram schematically illustrating a composite casting system for manufacturing a heterogeneous material casting product according to the present disclosure.
Figure 4:
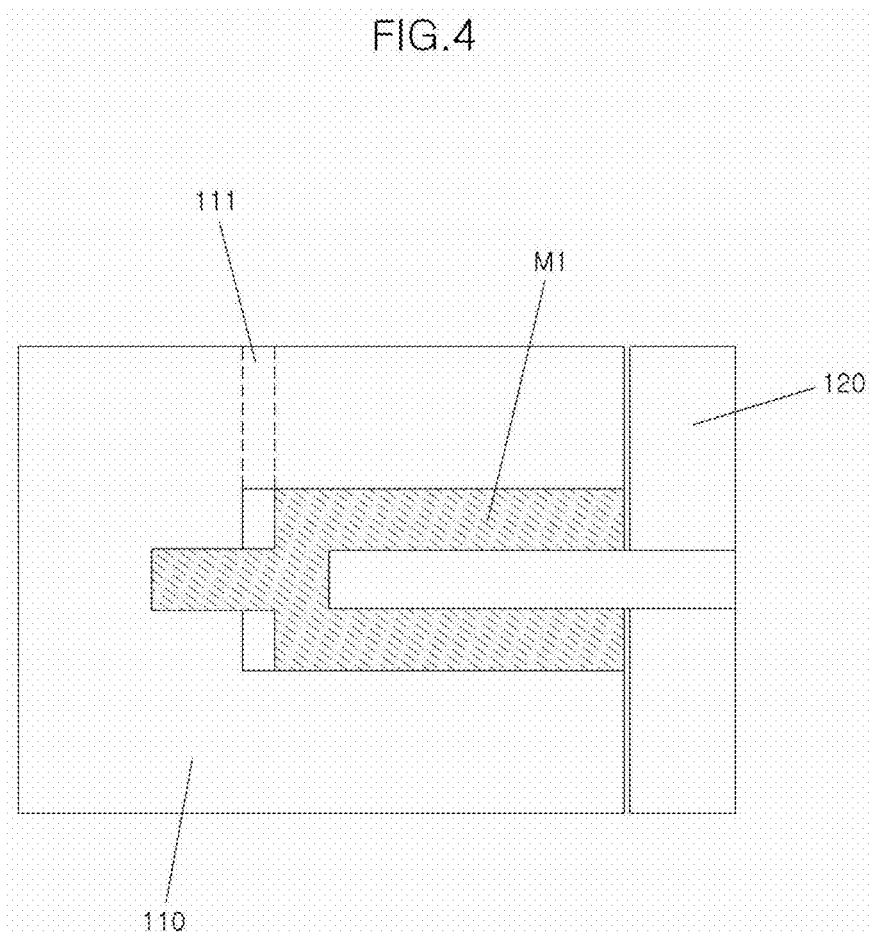
FIGS. 4 and 5 are diagrams sequentially illustrating part of a composite casting method of the composite casting system for manufacturing the heterogeneous material casting product of the present disclosure.
Figure 5:
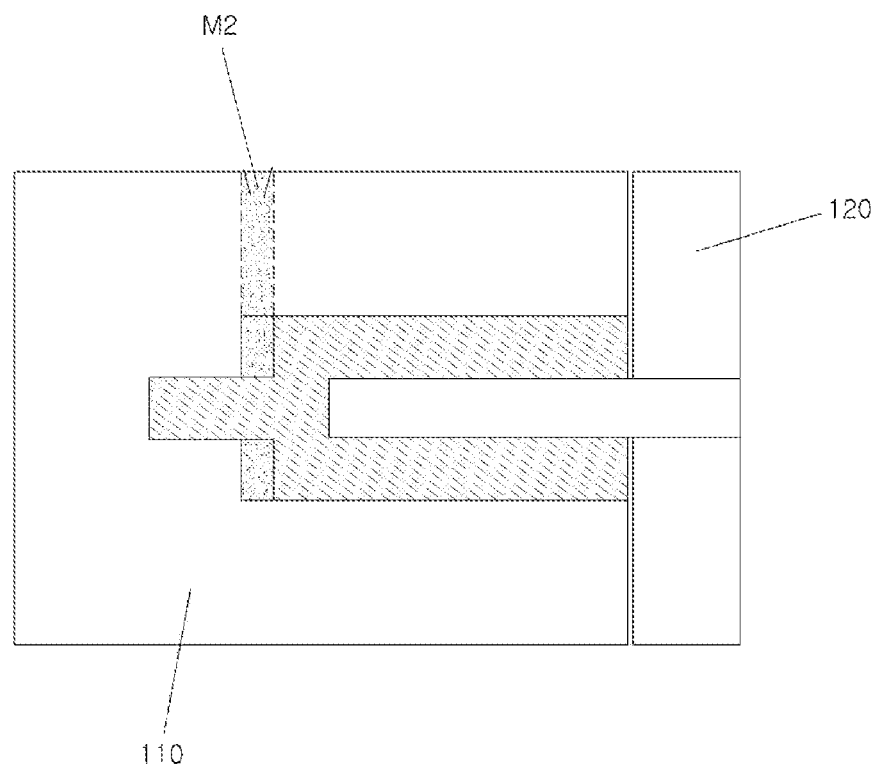

FIG. 3 is a diagram schematically illustrating a composite casting system for manufacturing a heterogeneous material casting product according to the present disclosure, and FIGS. 4 and 5 are diagrams sequentially illustrating a part of a composite casting method of the composite casting system for manufacturing the heterogeneous material casting product of the present disclosure.

Hereinafter, a composite casting system and a composite casting method for manufacturing a heterogeneous material casting product, and the heterogeneous material casting product manufactured by the composite casting method according to an embodiment of the present disclosure will be described with reference to FIGS. 3 to 5.

Simultaneously manufacturing by integrating a heterogeneous material casting product has many advantages.

Firstly, it can function as a functional agent. For example, a transmission retainer part may require abrasion resistance only for the surface portion, and it is possible to realize a reduction in the cost and lightweight by casting the surface with K14 and the inside with ADC12.

Secondly, it is possible to perform the casting at the same time rather than two different casting processes for casting the heterogeneous material, thereby reducing a cycle time, and saving the cost.

For this purpose, the composite casting system and the composite casting method of the present disclosure can perform the high-pressure casting and the gravity casting at the same time, thereby manufacturing a heterogeneous material casting product.

In embodiments, as illustrated in FIG. 3, the composite casting system for manufacturing the heterogeneous material casting product according to an embodiment of the present disclosure includes a fixed mold 110, a movable mold 120, a slide core pin 130, a high-pressure casting device 140, and a gravity casting device.

A cavity C corresponding to the shape of the casting product to be cast is formed inside the fixed mold 110, and the movable mold 120 is operated to close or open the right side of the cavity C.

As illustrated, a protruded portion 121 of the movable mold 120 is for the internal shape of the casting product, which is not essential as it depends on the casting product.

In embodiments, the cavity C corresponding to the shape of the casting product is a space formed by a combination of the fixed mold and the movable mold, and unlike the present embodiment, this can implement the shape of the cavity C in the movable mold 120, or can also implement so that the fixed mold and the movable mold are combined while partially having the shape of the cavity C, respectively.

In embodiments, the fixed mold 110 is configured to be coupled to the slide core pin 130 that can be inserted into the fixed mold 110 from the cavity C, and can be protruded to the cavity C side from the fixed mold 110.

An operation of the slide core pin 130 may require a separate core pin operating means.

According to the implementation, the slide core pin 130 can be configured at the movable mold 120 side. For example, the slide core pin 130 can be configured to be inserted into the movable mold 120, and to be protruded to the cavity C side from the movable mold 120.

In embodiments, a gravity casting hole 111 passing through the cavity C is formed on the upper portion of the fixed mold 110.

In embodiments, the diameter of the injection port of the cavity C side of the gravity casting hole 111 may be preferably equal to or smaller than the protruded length of the slide core pin 130. Therefore, when the slide core pin 130 is protruded, the gravity casting hole 111 is blocked to prevent scattering through the gravity casting hole 111.

As described above, if the shape of the cavity C is implemented in the movable mold 120, the gravity casting hole 111 can be configured to pass through the cavity C on the upper portion of the movable mold 120.

In embodiments, as will be described later, in order to cool and then take out the injected molten metal after the gravity casting, it may be necessary to cut the molten metal filled and hardened in the portion of the gravity casting hole 111, and for ease of cutting, it may be preferable to be distinguishable between the boundaries of the gravity casting hole 111 corresponding to a feeder and the cavity C.

In embodiments, it may be preferable that the gravity casting hole 111 formed in the fixed mold 110 or the movable mold 120 has a minimum of the inner diameter of the lowest surface on the flat cross section corresponding to the boundary with the cavity C.

In some implementations, the gravity casting hole 111 can also have a cone shape in which the entire or only part of the bottom portion is reduced in an inner diameter toward the bottom surface thereof, and for easy of cutting, it may be preferable that only part of the bottom portion including the lowest surface has a curved shape, which is reduced in an inner diameter.

In embodiments, the high-pressure casting device 140 is coupled to the movable mold 120 side to inject high-pressure casting molten metal M1 into the cavity C, and the gravity casting device injects molten metal M2 through the gravity casting hole 111 of the fixed mold 110.

The gravity casting device injects the molten metal M2 through the gravity casting hole 111 of the fixed mold 110.

As illustrated, although the high-pressure casting device 140 has been coupled to the movable mold 120 side as an example, the high-pressure casting device can also be coupled to the fixed mold 110 side.

In the composite casting method according to the present disclosure, firstly, the movable mold 120 is combined by closing the fixed mold 110 in a state where the slide core pin 130 has been protruded to the cavity C from the fixed mold 110. This state becomes the state illustrated in FIG. 3.

In embodiments, the high-pressure casting device 140 injects the high-pressure casting molten metal M1 into the cavity C from the movable mold 120 side, and this state becomes the state as in FIG. 4. The high-pressure casting molten metal M1 may be preferably a lightweight material such as an aluminum material.

In embodiments, the slide core pin 130 is inserted or retracted into the fixed mold 110, such that the cavity C becomes an empty state by the volume occupied by the slide core pin 130 as illustrated.

In such a state, when the gravity casting device injects or pour the gravity casting molten metal M2 through the gravity casting hole 111 formed on the upper portion of the fixed mold 110 as in FIG. 5, the space occupied by the slide core pin 130 is filled with the gravity casting molten metal M2.

The gravity casting molten metal M2 is a material different from the high-pressure casting molten metal M1, and can be a material considering abrasion resistance.

The space occupied by the slide core pin 130 becomes a surface portion to be formed on the casting product, which is cast by the gravity casting, and therefore, the slide core pin 130 can have the protruded length, the number, the shape, etc. according to the surface portion to be formed on the casting product.

When the gravity casting is completed, the movable mold 120 is operated after cooling the molten metal to open the mold to take out the casting product.

Then, the casting product is taken out after cutting the molten metal, which has been filled and cooled in the portion of the gravity casting hole 111, by a cutting means, and the cutting means can be an eject pin or a separate slide core.

It is possible to secure the ease of cutting due to the shape of the interface between the gravity casting hole 111 and the cavity C as described above.

For example, the interface can be cut by the eject pin, and the side surface can be provided with a slide core to enable the cutting of the interface by a direct physical force.

In embodiments, it is also possible to additionally operate a plunger of the high-pressure casting device at the time point when the gravity casting molten metal is solidified after the gravity casting to perform the pressurization, thereby further securing shrinkage compensation and castability.

As described above, the present disclosure can perform the high-pressure casting and the gravity casting sequentially and simultaneously without interruption by the integrated system and method to enable the heterogeneous material casting product to cast, and can be further advantageous in forming the surface portion requiring rigidity.

Figure 6:
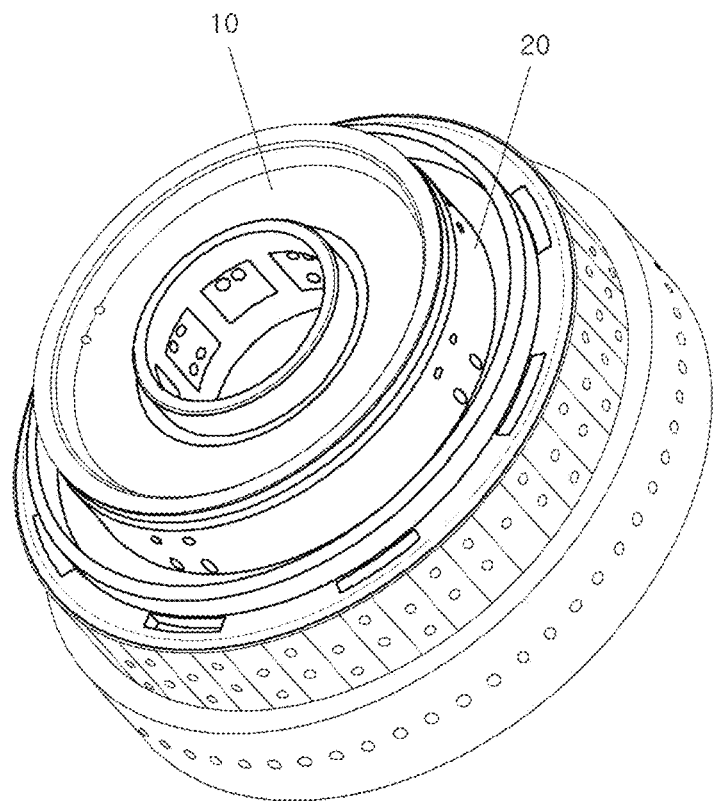
FIG. 6 is a diagram illustrating an example of the heterogeneous material casting product according to the present disclosure.

For example, a body part 20 can be made of a lightweight material such as aluminum like the retainer part illustrated in FIG. 6, and the surface portion 10 can be cast with a material different therefrom.

In the illustrated transmission retainer, the surface portion 10 becomes a friction portion that rotates by engaging with other parts.

Typical aluminum drums are that there occur stuck, pressed, abraded, and a broken opening portion on the friction portion upon the durability test.

In order to address the foregoing, the corresponding friction portion can be made of hypereutectoid alloy such as B390 aluminum alloy with a material having high abrasion, but the composite casting of the heterogeneous material according to the present disclosure can further save the cost, and also secure abrasion resistance of the surface portion.

Furthermore, in the above-described insert casting, the portion having completed the gravity casting becomes a state with the stable physical properties at room temperature to increase the temperature again due to the influence of the molten metal upon the high-pressure casting, and a re-crystallization layer can be formed, thereby causing deterioration of the physical properties.

This is a factor that can cause cracks in the parts and adversely affect durable quality.

However, the present disclosure performs the gravity casting immediately after completing the high-pressure casting to perform the gravity casting before the tissue stabilization of the high-pressure cast portion, thereby preventing re-crystallization of the tissue.

Figure 7:
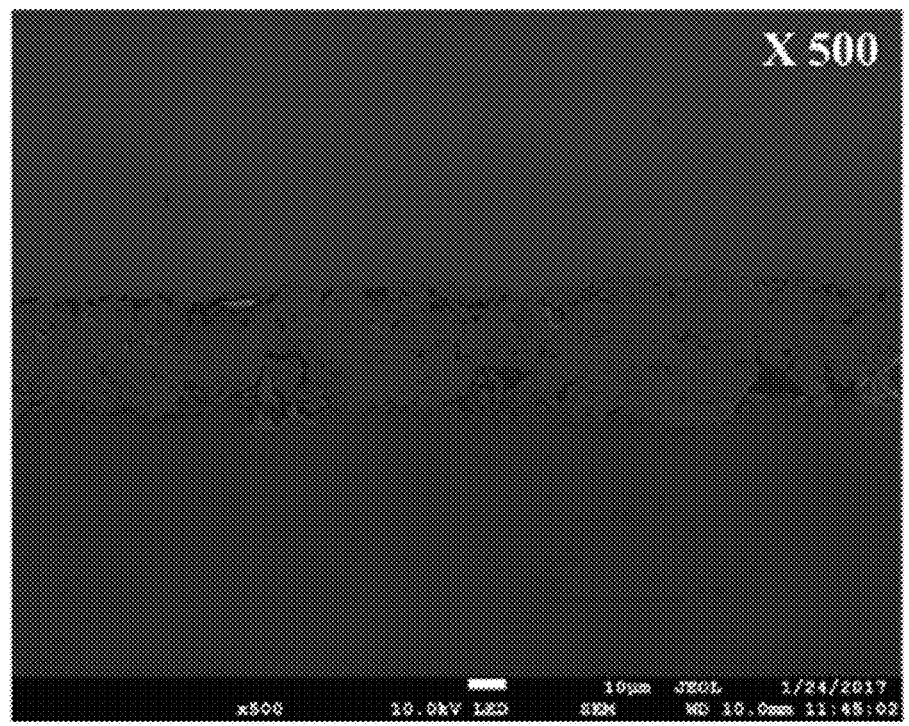
FIG. 7 is a diagram illustrating the interface between the heterogeneous materials according to the present disclosure.

Therefore, in embodiments, as can be confirmed in FIG. 7, the mutual melting bonding between the heterogeneous materials can be optimized under a relatively sufficient temperature, thereby securing a bonding force of the bonding interface and improving the durable quality of the product.

For example, when two kinds of materials met, the melting bonding was a form in which a relatively high temperature material partially melted and bonded the surface of a relatively low temperature material, it can be confirmed that the melting was performed at the interface of the center portion of the photo, and therefore, it can be seen that the melting bonding is performed by being further optimized as two castings are integrally performed than that two casting methods are performed with interruption.

As described above, while the present disclosure has been described with reference to the drawings, it is not limited to the described embodiments, and it is to be understood by those skilled in the art that various modifications and deformations can be made without departing from the spirit and the scope of the present disclosure. Therefore, the modified examples or the deformed examples should be included in the claims of the present disclosure, and the scope of the present disclosure should be construed based on the appended claims.

What is claimed is:

1. A composite casting system for manufacturing a heterogeneous material casting product, comprising:
   a first mold;
   a second mold, wherein one of the first mold and the second mold is movable with respect to the other;
   a slide core pin provided in the first mold, wherein the slide core pin is configured to slide out of the first mold for protruding into a cavity, which is formed by the first mold and the second mold, and further configured to move in the first mold for providing a space for gravity casting;
   a high-pressure casting device configured to inject high-pressure casting molten metal into the cavity; and
   a gravity casting device configured to supply gravity casting molten metal through a gravity casting hole formed on the first mold.

2. The composite casting system of claim 1, wherein the slide core pin is coupled to the first mold to be retractable into the first mold, and the high-pressure casting device is provided in the second mold.

3. The composite casting system of claim 2, wherein the gravity casting hole is formed to pass through the cavity from an upper portion of the first mold corresponding to an upward of the slide core pin protruded to the cavity.

4. The composite casting system of claim 3, wherein a diameter of an injection port of the cavity of the gravity casting hole is equal to or smaller than the length of a portion of the slide core pin protruding to the cavity.

5. The composite casting system of claim 3, wherein the gravity casting hole has a minimum of an inner diameter of a lowest part.

6. The composite casting system of claim 1, wherein the materials of the high-pressure casting molten metal and the gravity casting molten metal are different from each other.

7. The composite casting system of claim 6, wherein the high-pressure casting molten metal is an aluminum material.

8. The composite casting system of claim 1, further comprising:
   a cutter configured to cut the gravity-casting metal filled and cooled in the portion of the gravity casting hole.

* * * * *